(No Model.)
A. V. MESEROLE.
SECONDARY BATTERY.
No. 381,941. Patented May 1, 1888.
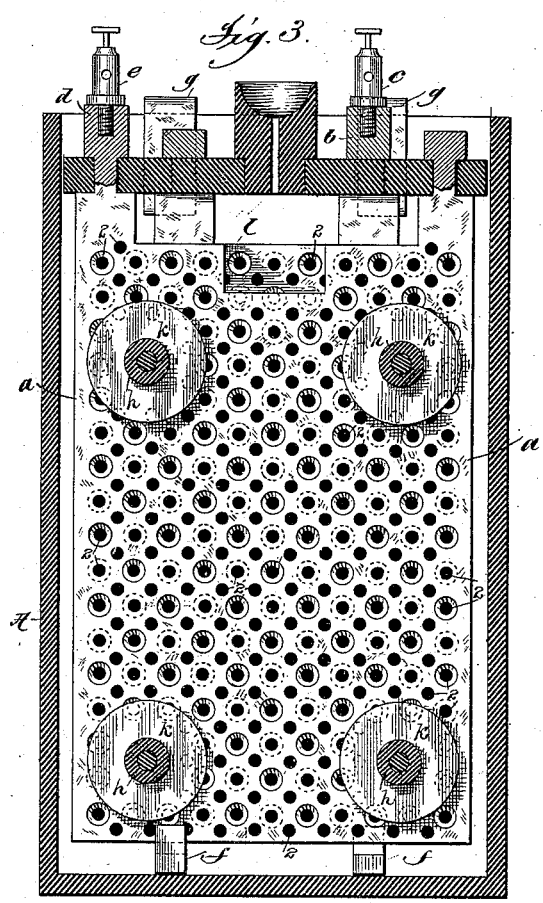
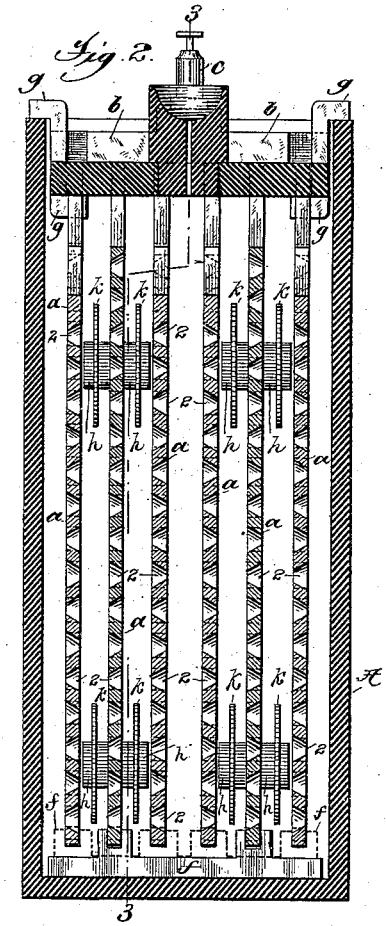
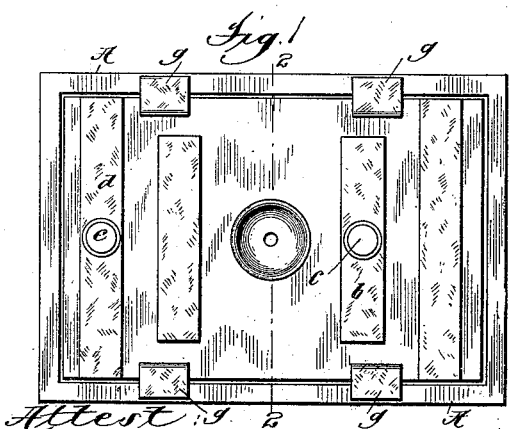
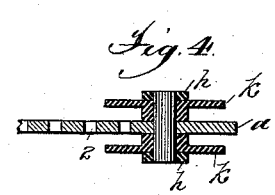
Inventor.
Abraham V. Meserole
by
Philip Philip Harry
Attys.

UNITED STATES PATENT OFFICE.

ABRAHAM V. MESEROLE, OF NEW YORK, N. Y.

SECONDARY BATTERY.

SPECIFICATION forming part of Letters Patent No. 381,941, dated May 1, 1888.

Application filed November 25, 1887. Serial No. 256,057. (No model.)

*To all whom it may concern:*

Be it known that I, ABRAHAM V. MESEROLE, a citizen of the United States, residing at New York, county of New York, and State of New York, have invented certain new and useful Improvements in Secondary Batteries, fully described and represented in the following specification and the accompanying drawings, forming a part of the same.

This invention relates to that general class of batteries known as "secondary" or "storage" batteries, it being the object of the invention to provide a battery of this class which shall be more efficient and reliable than those heretofore in use.

To that end the invention consists, primarily, in a novel form of electrode, and, secondly, in certain improvements in the manner of supporting and insulating the electrodes.

As a full understanding of the improvements constituting the invention can be best given by an illustration and a somewhat detailed description of a battery embodying the same, all preliminary description will be omitted and a full description given, reference being had to the accompanying drawings, in which—

Figure 1 is a plan view of a secondary battery constructed according to the present invention. Fig. 2 is a vertical section taken on the line 2 of Fig. 1. Fig. 3 is an irregular section taken on the line 3 of Fig. 2. Fig. 4 illustrates a detail; and Fig. 5 illustrates a modification, which will be hereinafter explained.

Referring to said figures, it is to be understood that the cup A of the battery is of the usual form, and is provided with the usual suspended conducting and retaining plates, $a$, forming the positive and the negative electrodes of the battery, the plates forming one electrode being connected at their upper ends to a conducting-bar, $b$, having a binding-post, $c$, for one wire of the circuit, while the plates forming the other electrode are connected to a similar bar, $d$, having a binding-post, $e$, for the other wire of the circuit.

The plates $a$, which are preferably made of lead, but may be of other material, are provided with large numbers of perforations, 2, many of which are funnel-shaped and arranged to flare in opposite directions, while others are of uniform diameter. By reason of this construction the superficial area is greatly increased. The plates of this form can be cheaply produced, and are exceedingly rigid in proportion to their weight. The perforations facilitate the circulation in the battery, and thus secure equal action or oxidation upon the opposite sides of the plates, and in the case of a battery of the Planté type the flaring sides of the perforations cause the plates to more readily shed the gas-bubbles formed during the charging of the battery. The plates $a$, when thus perforated, are, by reason of the more even distribution of the electrolytic action, less liable to warp or buckle. The plates thus formed are equally available in those batteries in which an active absorbent material or agent is employed. In such case two of the plates $a$ are placed face to face, forming a composite plate, as shown in Fig. 5, and are secured together by lead rivets 3, passing through a part or all of the openings 2 which flare outward. The openings 2 which flare inward form cavities, which may be filled with any suitable active absorbent material or agent, 4— such, for example, as oxide of lead. The cavities thus formed are of such shape that the absorbent agent 4 cannot be readily dislodged, but will always remain firmly in contact with the plates. The perforations 2 which are not flared or of funnel shape afford in this case, the same as before, free circulation between the opposite sides of the plates, and thus equalize the action between the opposite sides and enable the battery to charge and discharge rapidly and without polarizing.

To maintain the bottoms of the plates $a$ in their proper relation and prevent them from warping and buckling, I employ what I term a "safety-prop," $f$, which clasps the bottoms of the plates, as shown, so as to maintain them in their proper relative positions, and also serves to relieve the supporting-cleats $g$ of a portion of the weight of the plates. It is not desirable to allow the bottoms of the plates to rest upon or be in close proximity to the bottom of the battery or cell, or to support the plates forming both the positive and negative electrodes upon the same prop or cleat, because in such case the deposit of sediment which will collect upon the bottom of the cell or the prop would connect the two electrodes, and, being acted on by the charging-current would be converted to a metallic condition and act to short-circuit the battery. The props $f$ raise the plates sufficiently far away from the bottom of the cell to be clear of any deposit which may collect thereon, and to prevent any deposit which may collect upon the props from forming a connection between the positive and negative electrodes I employ separate props for the plates of each electrode, the prop of each being cut away, as shown, so as to be considerably removed from the other; or by making the plates of one electrode slightly shorter than those of the other, and providing these shorter plates with portions of insulating material to rest upon the prop, all the plates may rest upon the same prop.

To still further secure the plates against the possibility of being brought into contact by warping or buckling, I provide the plates forming one electrode with fenders $h$, of insulating material, which are secured to the plates in any suitable number and position, depending upon the size of the cell, by means of insulating bolts or pins passing through the plates. In order to prevent any deposit which may collect upon the fenders $h$ from short-circuiting the battery in the manner already described in connection with the props $f$, which practice has demonstrated is likely to occur, I provide the fenders $h$ with thin disks $k$, of hard rubber or glass, which are supported about midway between the plates. It is quite evident that the disks $k$, forming as they do vertical insulating walls around the fenders, will prevent any bridging over by deposits of sediment. In some cases it may be preferable to extend the disks $k$, so as to make them of the same or nearly the same size as the plates $a$, and in such case they should be perforated somewhat like the plates $a$, except in close proximity to the fenders $h$.

The plates $a$, or some of them, are preferably provided at their upper edges with recesses or notches $l$, to serve as a gage in filling the cell.

In conclusion, it is to be remarked that the several features which have been described may be used independently without wholly departing from the invention—that is to say, the plates constructed as described may be used without the props and fenders, and the latter may each be used without the other.

What I claim is—

1. An electrode for secondary batteries, consisting of a plurality of plates of lead or other suitable material placed face to face in close contact, each plate being provided with funnel-shaped perforations which flare in opposite directions, substantially as described.

2. In a battery-cell, the combination, with a plurality of plates forming the positive electrode, of an insulating-prop, $f$, for grasping and supporting the edges of said plates, and cut away so as to be out of contact with the plates of the other electrode, substantially as described.

3. A battery-cell provided with independent insulating-props $f$, for grasping and supporting the edges of the plates forming the two electrodes, the prop for each electrode being cut away so as to be out of contact with the other electrode, substantially as described.

4. The combination, with the plates $a$, forming the positive and negative electrodes, of the fenders $h$, provided with the disks $k$, of insulating material, substantially as described.

In testimony whereof I have hereunto set my hand in the presence of two subscribing witnesses.

ABRAHAM V. MESEROLE.

Witnesses:
J. J. KENNEDY,
GEORGE H. BOTTS.